United States Patent [19]

Pivar

[11] 3,914,105

[45] *Oct. 21, 1975

[54] MULTIPLE PIECE MOLD APPARATUS AND METHOD TO MANUFACTURE HOLLOW ARTICLES

[75] Inventor: Stuart Pivar, Muttontown, N.Y.

[73] Assignee: Rototron Corporation, Farmingdale, N.Y.

[ * ] Notice: The portion of the term of this patent subsequent to Nov. 21, 1989, has been disclaimed.

[22] Filed: Feb. 5, 1973

[21] Appl. No.: 329,374

[52] U.S. Cl. .......... 425/435; 425/450.1; 425/451.6
[51] Int. Cl.² ...................... B28B 1/20; B29C 1/16
[58] Field of Search .......... 425/425, 450, 451, 435, 425/429, 434, 430, 451.1, 451.3, 451.4, 451.5, 451.6, 451.7

[56] References Cited
UNITED STATES PATENTS

| | | | |
|---|---|---|---|
| 2,740,159 | 4/1956 | Berg | 425/425 |
| 3,151,196 | 9/1964 | Tipton | 425/450 |
| 3,173,175 | 3/1965 | Lemelson | 425/435 X |
| 3,351,983 | 11/1967 | Grigull | 425/451 X |
| 3,632,281 | 1/1972 | Ilyashenko et al. | 425/450 |
| 3,676,037 | 7/1972 | Pivar | 425/435 |
| 3,703,348 | 11/1972 | Pivar | 425/435 X |
| 3,751,551 | 8/1973 | McGillvary | 425/435 X |

FOREIGN PATENTS OR APPLICATIONS

| | | | |
|---|---|---|---|
| 842,347 | 7/1960 | United Kingdom | 425/429 |

*Primary Examiner*—C. W. Lanham
*Assistant Examiner*—D. M. Gurley
*Attorney, Agent, or Firm*—Roberts & Cohen

[57] ABSTRACT

Apparatus is provided for the molding of a hollow article from a thermoplastic material. This apparatus includes a hollow mold including first and second complementary mold parts having a common axis of rotation. The mold parts are provided with engageable edges at which the parts abut to seal the mold against the leakage of the thermoplastic material. These engageable edges may take the form of flanges which are perpendicular to the axis of rotation of the mold. A rotation mechanism is provided to support one of the parts and to rotate the same on the axis of rotation. A releasable clamp is provided to clamp the other of the two parts releasably against the rotated part such that the two parts rotate together when the clamp is effecting a clamping force thereon.

11 Claims, 3 Drawing Figures

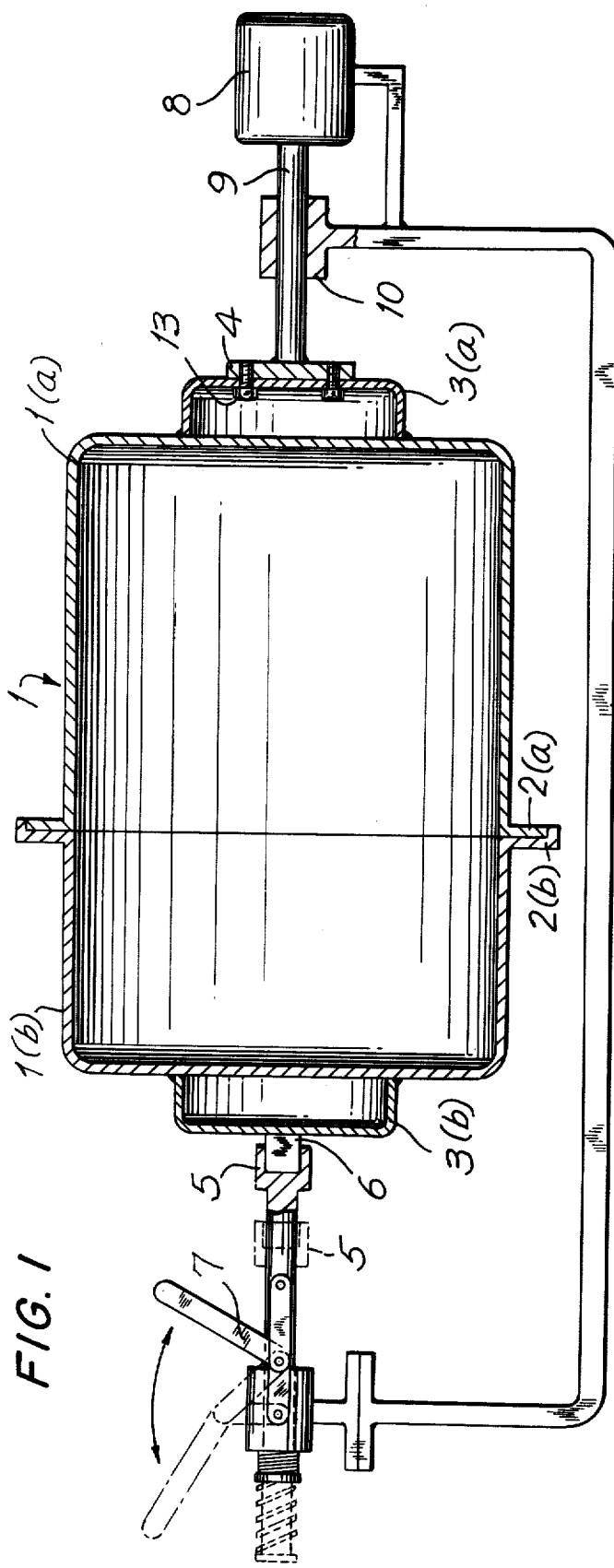

MULTIPLE PIECE MOLD APPARATUS AND METHOD TO MANUFACTURE HOLLOW ARTICLES

FIELD OF THE INVENTION

This invention relates to apparatus for molding large hollow objects, such as containers and housing, of thermoplastic materials using simple equipment and featuring especially rapid means for removing finished articles from molds and preparing the molds for the manufacture succeeding parts.

BACKGROUND

Rotational molding has been long known as a means of making hollow objects of thermoplastic materials such as polyvinyl chloride and polyethylene. In rotational molding, a hollow metal mold is charged with thermoplastic material in either liquid or powder form. The mold is then subjected to slow multiaxial rotation while being heated. The thermoplastic material then fuses to the interior wall of the mold whereon it congeals and subsequently hardens when the mold is cooled. The mold is then opened and the finished article removed.

Molds for this purpose are generally built with a large opening to permit the removal of the finished part. They are sometimes made in two halves. In order to retain the material contained inside and to prevent its leakage during the molding cycle, such molds are typically fitted with closures consisting of wide opposing flanges which are pressed tightly together by means of multiplicity of clamping devices which are sometimes part of the mold and sometimes separate from the mold. The above-mentioned opposing flanges in addition to being wide and thick are often built with tongue and groove configurations to further assure a tight fit.

It is known that, in the use of automatic plastic molding machinery and particularly machinery used to do rotational molding, the largest amount of work done and time spent by the operator of the machine is in the opening of the mold when the piece is finished, the removal of the finished piece, the recharging of the mold and the replacing of the cover to prepare for the molding of the next part. In rotational molding, much of this time is spent in the removal of the above-mentioned clamping devices, the realigning of the cover when it is replaced and the replacement of the clamping devices. Often as many as a dozen clamps are used on a mold of average size, this contributing significantly to the amount of time required for recycling the machinery involved.

SUMMARY OF THE INVENTION

An object of the invention is to provide for saving time in the operation of removing a molded part from a mold and preparing for the molding of the next part.

A further object is to provide simplified and novel means for preventing the escape of molding material from a mold during the molding cycle.

In accordance with the invention, a removable mold is supported on a molding machine by means of a single clamp which performs the dual purpose of fixing the mold tightly in place during the molding cycle and at the same time applies sufficient pressure to the cover or closure to prevent leakage of material during the molding cycle. The opening of this single clamp simultaneously permits detaching the mold from the machine and disengaging the cover from the mold. It has been found both by practiice and experimentation that satisfactory results can be repeatedly obtained this way even through it has generally been considered good practice in the past to use a multiplicity of clamps to effect closure. The attachment of the mold to the machine is accomplished separately by means of screw type fasteners such as machine bolts and nuts.

Stated more generally, in order to achieve the above and other objects of the invention, there is provided apparatus for the molding of a hollow article from thermoplastic material. Said apparatus comprises a hollow mold including first and second parts having a common axis of rotation and including engageable edges at which the parts abut to seal the mold against the leakage of said material. Rotation means are provided to support one of said parts and to rotate the same on said axis. Clamp means are used to clamp the other of said parts releasably against said one part and to allow the rotation of said other part with said one part when the parts are clamped together.

In accordance with a feature of the invention, the clamp means includes a bearing and means for selectively moving said bearing between extended and retracted positions relative to the mold. In accordance with a further feature of the invention, there is a pin on said other part and engaged in the aforesaid bearing.

According to a specific embodiment of the invention, the clamping means may include a toggle clamp capable of moving the aforesaid bearing between the extended and retracted positions.

According to yet another feature of the invention, flanges may be provided on the mold parts which are each perpendicular to the axis of rotation. Advantageously, the aforesaid clamp means exerts a clamping force along the axis of rotation.

The one part mentioned above with respect to the mold, which is the rotated part or the part through which the mold is driven, may be relatively fixedly mounted on the rotation means such as by nuts and bolts or may be demountably mounted on the rotation means by cooperating male and female members which are mateable to couple said one part to the rotation means. According to one embodiment of the invention, the mating male and female members may be mating polygonal parts. According to another embodiment, the mating male and female members may be mating conical members. Other possibilities also lie within the scope of the invention.

BRIEF DESCRIPTION OF THE DRAWING

FIG. 1 is a diagrammatic side view of one embodiment of the invention;

FIG. 2 is a fragmentary illustration of a variation; and

FIG. 3 is a fragmentary illustration of a further variation.

DETAILED DESCRIPTION

FIG. 1 shows a mold 1 which consists of two parts 1(a) and 1(b) which close together tightly by means of opposing flanges 2(a) and 2(b). The mold parts are attached to the machine by means of mold brackets 3(a) and 3(b) which respectively engage bracket driver 4 and a bearing 5, the latter engaging a pin 6. A toggle clamp 7 presses the mold closed. It exerts a force along the common axis of rotation or axis of symmetry of the mold parts. This axis is preferably perpendicular to the flanges 2(a) and 2(b).

The mold is rotated by a rotating mechanism or motor 8 which rotates the drive shaft 9 which is supported by bearing 10. The ends of the rotating mold structure are supported on the machine frame 11.

At the end of a molding cycle, the clamp is opened to disengage the pin 6 from bearing 5, the position of which is controlled by the clamp. The mold is removed from the bracket driver 4 and the two parts of the mold separated from each other. The molded part (not shown) is removed, and the mold is then recharged and replaced on the machine.

In the above arrangement, the mold driving bracket may be attached to the mold bracket 3(a) with bolts and nuts 13. In this case, the toggle clamp 7 is opened which disengages the pin 6 from the clamp bearing 5. This permits one part of the mold to be disengaged. This part is removed and the finished articles removed from the mold while the other mold part remains attached to the machine.

The toggle shown can be replaced by a different kind of clamp including, for example, a screw type clamp which travels longitudinally back and forth.

In further accordance with the invention, there is provided a means for demountably attaching mold part 1(a) to a molding machine for rotation thereon by means of a cone-shaped supporting member 14 which is engaged in a cone-shaped socket 15 (FIG. 2) or by a member 16 of polygonal profile which is engaged in a correspondingly shaped socket 17 (FIG. 3). These supporting devices permit the operator to attach the mold in a choice of positions about its axis.

There has thus been shown above apparatus for the molding of hollow articles from thermoplastic material, said apparatus comprising a hollow mold including first and second parts having a common axis of rotation and including engageable edges at which the parts abut to seal the mold against the leakage of said material, rotation means to support one of said parts and to rotate the same on said axis, and clamp means to clamp the other of said parts releasably against said one part and to allow the rotation of said other part with said one part when the parts are clamped together.

It has also been shown that the clamping means may include a bearing and means for selectively moving said bearing between extended and retracted positions relative to said mold, the latter said means being, for example, a toggle clamp with a pin on the other part and engaged in the aforesaid bearing.

These will now be obvious to those skilled in the art many modifications and variations of the structure set forth hereinabove. These modifications and variations will not depart from the scope of the invention if defined by the following claims.

What is claimed is:

1. Apparatus for the molding of a hollow article from thermoplastic material, said apparatus comprising a hollow mold including first and second parts having a common axis of rotation and including engageable edges at which the parts abut to seal the mold against the leakage of said material, rotation means to support one of said parts and to rotate the same on said axis, and clamp means to clamp the other of said parts releasably against said one part and to allow the rotation of said other part with said one part when the parts are clamped together, said clamp means including a bearing and means for selectively moving said bearing between extended and retracted positions relative to said mold, said other part including a pin extending axially into the said bearing and freely removable therefrom whereby the need for physically clamping said engageable edges together is avoided.

2. Apparatus as claimed in claim 1 wherein said clamp means exerts a clamping force along the axis of rotation of said parts.

3. Apparatus as claimed in claim 1 wherein said parts include flanges at said edges, said flanges being engaged in sealing relationship.

4. Apparatus as claimed in claim 1 wherein said one part is relatively fixedly mounted on said rotation means.

5. Apparatus as claimed in claim 1 wherein said one part is demountably mounted on said rotation means.

6. Apparatus as claimed in claim 5 comprising male and female means mateable to couple said one part to said rotation means.

7. Apparatus as claimed in claim 6 wherein said male and female means are mating polygonal members.

8. Apparatus as claimed in claim 6 wherein said male and female means are mating conical members.

9. Apparatus as claimed in claim 3 wherein said flanges are perpendicular to said axis.

10. Apparatus as claimed in claim 2 wherein said clamping means includes toggle means coupled to said bearing.

11. Apparatus as claimed in claim 1 wherein said clamp means is a mechanical leverage mechanism.

* * * * *